C. WARREN.
VARIABLE SPEED TRANSMISSION DEVICE.
APPLICATION FILED JUNE 26, 1913.
1,126,322.
Patented Jan. 26, 1915.
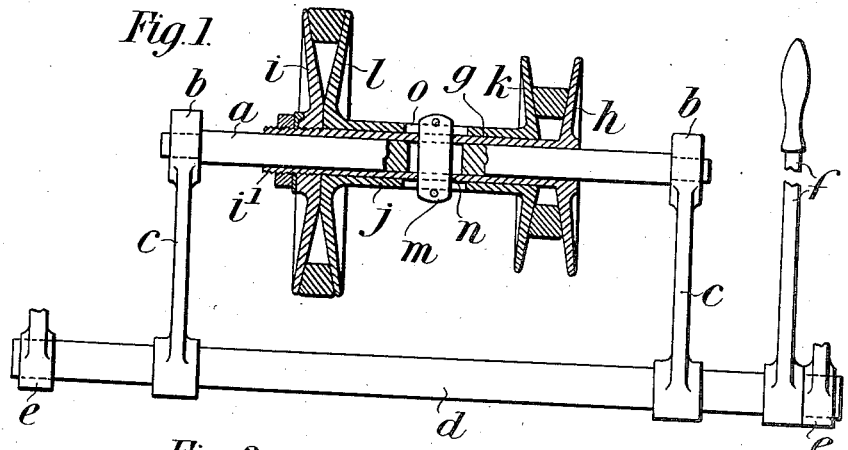
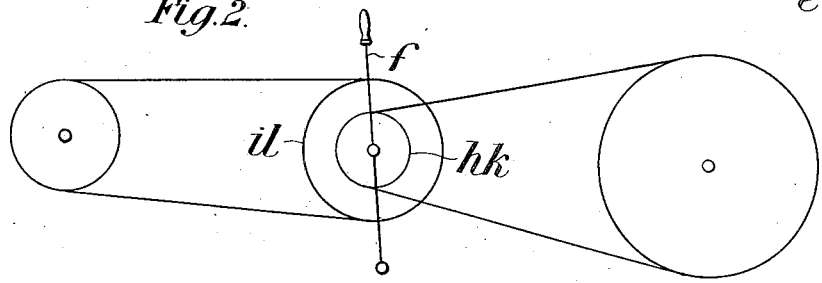
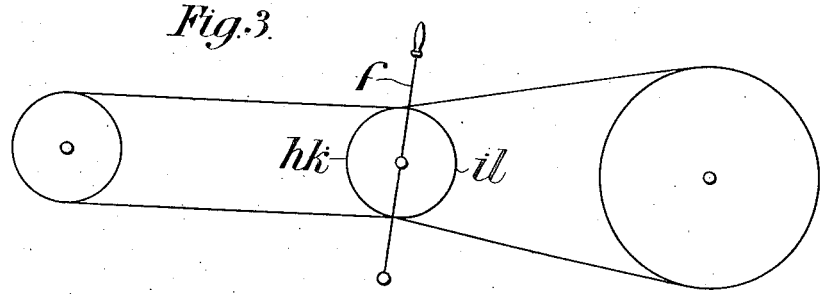
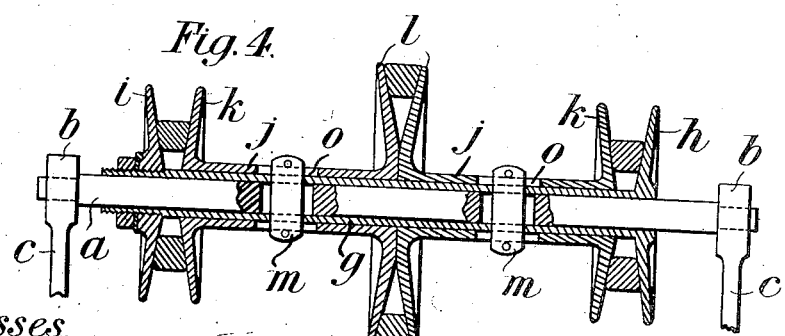
Witnesses.
J. K. Moore
Robt E. Barry
Inventor.
Charles Warren
By Whitaker & Prevost
attys.

UNITED STATES PATENT OFFICE.

CHARLES WARREN, OF WITHAM, ENGLAND, ASSIGNOR OF TWO-THIRDS TO GLOVER BROTHERS (WITHAM) LIMITED, OF WITHAM, ENGLAND.

VARIABLE-SPEED-TRANSMISSION DEVICE.

1,126,322.      Specification of Letters Patent.      Patented Jan. 26, 1915.

Application filed June 26, 1913. Serial No. 775,957.

*To all whom it may concern:*

Be it known that I, CHARLES WARREN, a subject of the King of Great Britain, residing at Witham, Essex, England, have invented new and useful Improvements in Variable - Speed - Transmission Devices, of which the following is a specification.

This invention relates to variable speed transmission devices chiefly designed for use in connection with motor driven road vehicles although it can also be used for power transmission generally, and to that class of devices by which the power of the motor is transmitted to a shaft by means of a belt running over pulleys, the rotation of this shaft being then transmitted to the driving axle or driven shaft also by means of a belt, means being provided whereby the ratio of driving and driven speeds may be varied by regulating the tension of the driving belt, this regulation automatically adjusting the speed as desired.

In carrying out the invention the intermediate shaft is rotatably mounted in bearings at the ends of brackets or arms mounted upon a rock-shaft, which is held in fixed bearings and can be rocked or slid by means of a lever or like device within reach of the hands of the driver of the vehicle to which the mechanism is fitted, or of the attendant in the case of other mechanisms. The intermediate shaft has mounted upon it a sleeve each end of which carries a flange, the said flanges forming the outside flanges of the driving and driven pulleys respectively. A second sleeve is mounted upon the first named sleeve between the aforesaid flanges, and this sleeve likewise carries a flange at each end, which flanges form respectively the other sides or flanges of the driving and driven pulleys. Means, such as a key device, are provided for connecting the two sleeves, so that they rotate together with the shaft, but can move laterally or axially with respect to one another within the limits allowed.

The flanges are preferably of such a shape that they take a belt or chain of round or of V-shape in cross section, the belt or chain being usually either of leather, rubber, metal or any other suitable material. In practice the V or belt grooves inclosed between the flanges are of different inclinations, that is to say, the flanges are so made that the inner faces thereof inclose angles of different degrees in the case of the two pulleys. The angles are preferably so chosen that equal axial movements of the adjustable flanges of the two pulleys permit of unequal radial movements of the belts running around the two pulleys, so as to compensate for the fact that one of the belts is moving outward, while the other is moving inward, relatively to the axis of the intermediate shaft.

The device operates as follows, that is to say, in the normal position the belts are located approximately midway between the flanges of the pulleys, in which case the inner flanges are centrally placed between the outer flanges of the two pulleys. If, now, the lever be turned so as to oscillate the rock-shaft in one direction, the driving belt is tightened, thereby causing the said belt to move toward the center of its pulley, this movement of the rock-shaft at the same time slackening the driven belt so that the said belt is caused to move toward the periphery of its pulley owing to the fact that the inner flange is moved toward its outer flange under the tightening action applied to the driving belt. By turning the rock-shaft in the opposite direction the reverse action takes place and by regulating the extent to which the rock-shaft is moved any desired speed ratio may be obtained. It will be understood that the improved transmission device is always maintained automatically in alinement.

The improved transmission is also applicable to cases in which a single driving pulley is employed in conjunction with a pair of driven pulleys as for example, in some types of motor driven road vehicles. In such cases the first sleeve, which is mounted upon the intermediate shaft, has slidably mounted upon it between its flanges a pair of sleeves which abut and each of which has a pulley flange at each end; the two abutting flanges form the driving pulley while the flanges at the other ends coact with the flanges on the first sleeve to form the two driven pulleys.

In practice means may be provided for compensating for the wear of the belts; for example one of the pulley flanges may be made adjustable upon its sleeve. Also, it is preferable to employ a large and small pulley on the intermediate rock-shaft, and the inner flanges of the said two pulleys, which are mounted upon the sliding sleeve, may be free to rotate on the intermediate shaft instead of being keyed thereto as above described.

In the accompanying drawings:—Figure 1 is a sectional side elevation of variable speed transmission device made according to the invention. Figs. 2 and 3 are two diagrammatic side views illustrating the device in its two extreme positions, and Fig. 4 is a view similar to Fig. 1 illustrating a modification.

$a$ is the intermediate shaft which is rotatably mounted in the bearings $b$ of the arms $c$ which are keyed upon the rock-shaft $d$. This rock-shaft is rotatably mounted in brackets $e$ carried by the chassis of the vehicle to which the device is fixed, or to any other stationary support, and is designed to be rocked by means of the handle or lever $f$ which, as above stated, in the case of a motor vehicle, extends to within reach of the hands of the driver. Instead of a hand lever $f$ a foot pedal may obviously be made use of.

$g$ is the sleeve which is mounted upon the intermediate shaft $a$, and $h$ and $i$ are respectively the two flanges which are mounted upon the two ends of the said sleeve. The flange $h$ is fixed relatively to the sleeve, but the flange $i$ is secured thereto by means of the screw-thread $i^1$, so that it can be adjusted axially on the said sleeve.

$j$ is the second sleeve which is mounted upon the sleeve $g$, and $k$, $l$ are the two flanges which are provided upon the two extremities of the said sleeve $j$, the flange $k$ forming with the flange $h$ one of the expanding pulleys and the flange $l$ forming with the flange $i$ the other of the expanding pulleys. The two sleeves are caused to rotate with the shaft $a$ by means of the key $m$ which extends through slots $n$ and $o$ in the said two sleeves, the slot $n$ being of just sufficient length to receive the key $m$, while the slot $o$ is longer so as to permit of play to enable the sleeve $j$ while rotating with the shaft to be adjusted axially thereon for the purpose of adjusting the relative diameters of the two pulleys.

As above stated, the flanges $h$, $k$ and $i$, $l$ are made so as to incline to one another at different angles. Although, the two pulleys $h$, $k$ and $i$, $l$ may be of any desired diameters, yet in practice it is preferred to make use of a large and a small pulley respectively as in the arrangement illustrated, in which case the belt groove of the larger pulley $i$, $l$ is of larger angle than that of the pulley $h$, $k$ of smaller diameter.

The improved transmission gear operates as follows, that is to say, in the normal position the belts are located approximately midway between the two flanges of each of the pulleys, and in this case the inner flanges $k$ and $l$ are placed centrally between the outer flanges $h$ and $i$ of the two pulleys. By turning the lever $f$ so as to oscillate the rock-shaft $d$ in one direction, the driving belt is tightened, thus causing the said belt to move toward the center of say the pulley $i$, $l$ the movement of the shaft at the same time slackening the driven belt on the pulley $h$, $k$, so that the said belt is caused to move toward the periphery of the latter pulley, this being due to the fact that the inner flange $l$ thereof is moved away from the outer flange $i$ under the tightening action applied to the belt.

As above stated the variation in the angles of the belt grooves of the two pulleys provides a simple means whereby the tensions upon the two belts are always retained practically constant, that is to say, whereby the inequalities in the two movements, due to the fact that in one case it is toward and in the other away from the center of the pulley, are compensated for.

Figs. 2 and 3 of the drawing show diagrammatically the positions of the parts of the device when in the two extreme positions.

Fig. 4 illustrates the construction wherein a single driving pulley is used in conjunction with a pair of driven pulleys. In this arrangement the sleeve $g$, which is mounted upon the intermediate shaft $a$, has arranged upon it two sleeves $j$ which have abutting flanges $l$ at one end to form the driving pulley and flanges $k$ at the other end which coact with the fixed flanges $h$, $i$ on the sleeve $g$ to form the two driven pulleys; a key $m$ and slot $o$ are provided in conjunction with each sleeve $j$.

Claims—

1. In a variable speed transmission device of the kind herein referred to, the combination with an intermediate shaft having an elongated slot, of means for rocking said shaft, a sleeve provided upon said shaft and having oppositely disposed pulley flanges at either end, said sleeve being also provided with a slot, a secondary sleeve having a slot and mounted upon said sleeve and provided at each end with oppositely disposed pulley flanges, the flanges of the two sleeves being so inclined that the two pulleys formed thereby have grooves of different angles, and a key passing through said slots, said key being secured in the slot in the first mentioned sleeve and being movable in the slots in the shaft and the secondary sleeve.

2. In a variable speed transmission device of the kind herein referred to, the combination with an intermediate shaft having an elongated slot, of means for rocking said shaft, a sleeve provided upon said shaft and having oppositely disposed pulley flanges at either end, said sleeve being also provided with a slot, a secondary sleeve having a slot and mounted upon said sleeve and provided at each end with oppositely disposed pulley flanges, the flanges of the two sleeves being so inclined that the two pulleys formed thereby have grooves of different angles, a key passing through said slots, said key being secured in the slot in the first mentioned sleeve and being movable in the slots in the shaft and the secondary sleeve, and means for adjusting one of the flanges on the first named sleeve to compensate for wear.

3. A variable speed transmission device comprising an intermediate shaft provided with a plurality of elongated slots, means for rocking said shaft, a sleeve provided upon said shaft and having oppositely disposed pulley flanges at either end, said sleeve being also provided with a plurality of slots, a plurality of secondary sleeves each having an elongated slot and mounted upon said first sleeve and each being provided at either end with oppositely disposed pulley flanges, the flanges of the sleeves being so inclined that one of the pulleys formed thereby has a groove of different angle from the other pulleys formed by said flanges, and keys passing through said slots, said keys being secured in the slots in the first mentioned sleeve and being movable in the slots in the shaft and the secondary sleeves.

4. A variable speed transmission device comprising an intermediate shaft provided with a plurality of elongated slots, means for rocking said shaft, a sleeve provided upon said shaft and having oppositely disposed pulley flanges at either end, said sleeve being also provided with a plurality of slots, a plurality of secondary sleeves each having an elongated slot and mounted upon said first sleeve and each being provided at either end with oppositely disposed pulley flanges, the flanges of the sleeves being so inclined that one of the pulleys formed thereby has a groove of different angle from the other pulleys formed by said flanges, keys passing through said slots, said keys being secured in the slots in the first mentioned sleeve and being movable in the slots in the shaft and the secondary sleeves, and means for adjusting one of the flanges in the first named sleeve to compensate for wear.

CHARLES WARREN.

Witnesses:
JOHN E. BONSFIELD,
C. G. REDFERN.